United States Patent [19]

Roeder et al.

[11] 3,773,025
[45] Nov. 20, 1973

[54] METHOD AND APPARATUS FOR EJECTION BY COMPRESSED GAS

[75] Inventors: Emil Roeder, Butler; Richard Collins, Denville, both of N.J.

[73] Assignee: Marotta Scientific Controls, Inc., Boonton, N.J.

[22] Filed: Nov. 2, 1971

[21] Appl. No.: 194,826

[52] U.S. Cl. ............................. 124/11 R, 114/238
[51] Int. Cl. ........................... F41f 1/04, F41f 3/10
[58] Field of Search .................... 124/11 R; 114/20, 114/238; 89/1.181

[56] References Cited
UNITED STATES PATENTS

| | | | |
|---|---|---|---|
| 1,033,993 | 7/1912 | Davison | 114/238 |
| 2,304,841 | 12/1942 | Mikkelsen | 124/11 R |

FOREIGN PATENTS OR APPLICATIONS

| | | | |
|---|---|---|---|
| 7,729 | 9/1913 | Great Britain | 114/238 |
| 124,467 | 4/1919 | Great Britain | 114/238 |
| 19,828 | 4/1915 | Great Britain | 114/238 |

Primary Examiner—Richard C. Pinkham
Assistant Examiner—Richard T. Stouffer
Attorney—Nichol M. Sandoe et al.

[57] ABSTRACT

Compressed gas ejection apparatus, such as is used for launching torpedos from submarines, has a substantial drop in gas pressure as the article in the apparatus is accelerated to the velocity of the ejection. This invention controls pressure of the gas by a pressure regulator placed between a source of compressed gas and the tube or holder of the ejection apparatus; and the pressure regulator supplies additional gas as the volume of gas increases during the ejection operation. The pressure is controlled and can be maintained at substantially full pressure for the full ejection operation, and can be adjusted to compensate for change in the mass of an article to be ejected, and for changes in the resistance to ejection such as results from variations in the depth of water and relative speed at which an ejection operation may be carried out. The controlled pressure makes possible uniform repeated operations of the ejection apparatus, and also makes possible repeat operations without waiting for an intermediate pressure reservoir to be restored to a predetermined pressure. In the preferred construction, a solenoid operated pilot regulator controls the delivery pressure of a main regulator that supplies gas to the impulse chamber of the ejector apparatus.

12 Claims, 7 Drawing Figures

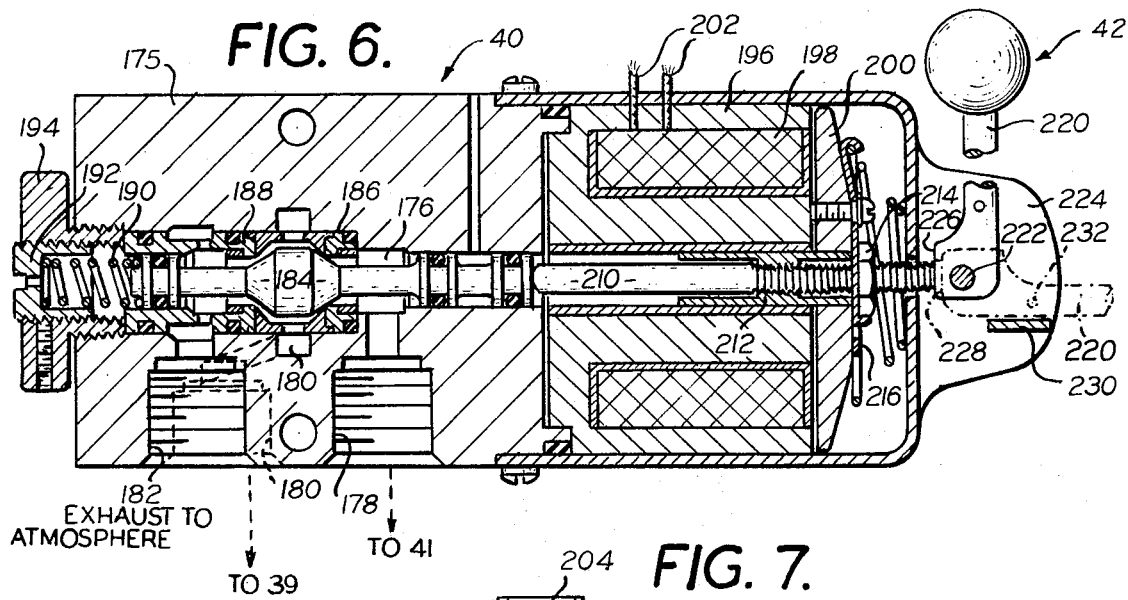
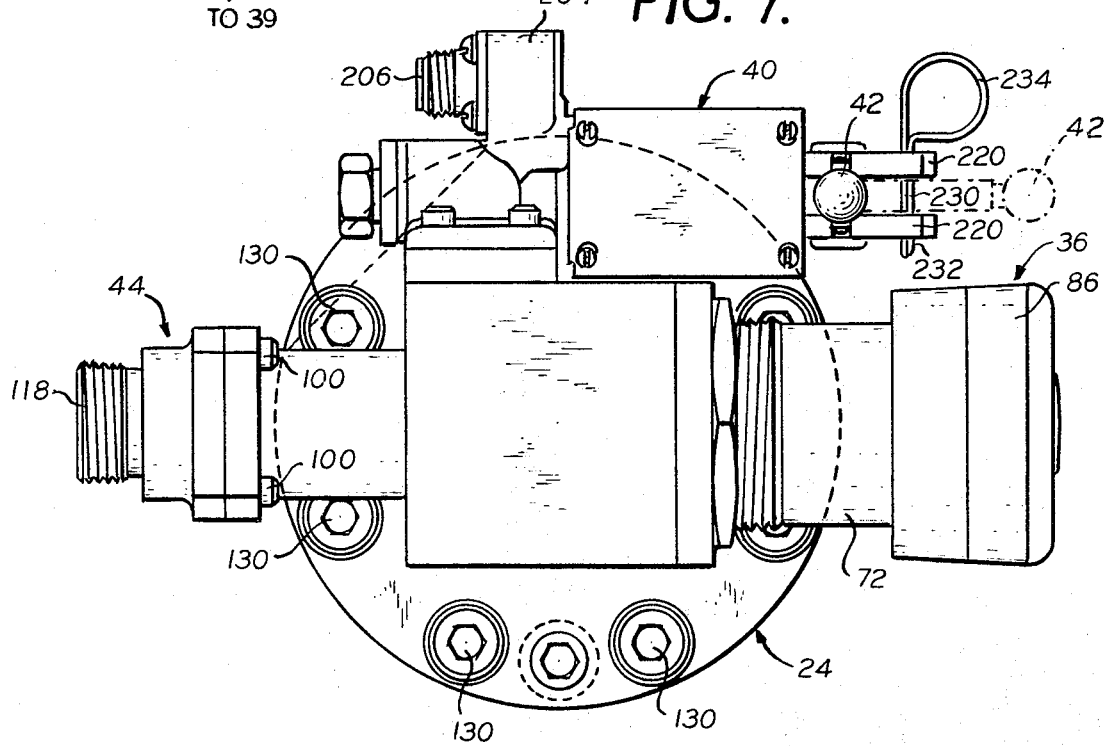

METHOD AND APPARATUS FOR EJECTION BY COMPRESSED GAS

BACKGROUND AND SUMMARY OF THE INVENTION

Apparatus that ejects an article, such as a submarine torpedo, from a tube relies upon the force of gas under pressure to accelerate the article to the desired velocity by the time the article reaches the end of the tube and is ejected therefrom. In ejection apparatus of the prior art where the gas pressure is that of gas confined in a flask that is put into communication with an impulse chamber of the ejection apparatus, the gas expands and drops in pressure from the time the flask is put into communication with the impulse chamber. The expansion of the gas in the flask may be considered substantially an adiabatic expansion as the volume of gas increases rapidly. The final pressure of the gas can be computed when the volume at ejection time is known but the expansion is largely uncontrolled in time because the rate of pressure drop depends upon the instantaneous velocities obtained during the ejection as the result of the interplay of force and resistance. Repeat operations with the same apparatus are very often not uniform.

With this invention gas pressure is supplied to an impulse chamber from a pressure regulator that receives gas from a source of compressed gas and that delivers gas to the impulse chamber at a controlled and somewhat reduced pressure. By having the delivery of gas from the regulator to the impulse chamber controlled during the ejection operation, the pressure of the gas in the impulse chamber can be maintained substantially constant even though the volume of the gas increases as water is forced out of the impulse chamber to an ejector tube from which an article is to be ejected.

Thus by use of the regulator, the ejecting force can be maintained more uniform during the entire time that the article being ejected is subject to acceleration. Final velocity can be accurately controlled; and if the resistance of the ambient medium into which the article is ejected increases, as by submersion into deeper water, the force in the impulse chamber can be increased by adjusting the delivery pressure of the regulator so as to compensate for the increased resistance of the ambient medium and thereby maintain the same velocity as before.

This invention vents the impulse chamber at the end of an ejecting operation and permits rapid return of any movable parts of the ejector apparatus to position for a repeat operation. It is not necessary to recharge a flask to a predetermined pressure, as with prior devices which relied upon expansion of the gas; and the ejector apparatus of this invention is ready for a subsequent operation immediately upon venting of the pressure of the previous operation because the operating pressure supplied by the delivery side of the regulator is available immediately. In the preferred construction, the impulse chamber is vented through the same regulator that supplies the pressure for the ejecting operation. This provides compact apparatus and assures coordination of the pressure supply and venting operations.

Another feature of the preferred embodiment of the invention is the controlling of the regulator that supplies the gas to the impulse chamber by means of a pilot regulator which supplies gas to a loading chamber of the main regulator. A three-way valve located between the delivery side of the pilot regulator and the loading chamber of the main regulator can provide communication of the pilot with the loading chamber when the valve is in one position and exhausts pressure from the loading chamber when the valve is in another position. By thus unloading the loading chamber of the main regulator, the venting of the impulse chamber is obtained since this effects a sudden increase in the ratio of delivery pressure to loading pressure and operates the main regulator vent. Preferably the pilot regulator loads the main regulator and the three-way valve controls venting of the impulse chamber through the main regulator without exhausting pressure from the loading chamber.

The three-way valve is provided with a motor for remote control and is also provided with a manual override for use when power for the motor is not available or where manual operation is preferred.

An optional feature with the invention is the provision of a compensator which is responsive to changes in the ambient medium and which automatically adjusts one of the regulators, preferably the pilot regulator, to compensate the change in resistance by increasing the pressure at which gas is delivered to the impulse chamber by the main regulator.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 6 is a sectional view of a solenoid operated three-way valve that controls the supply to, and exhaust of gas from, the main regulator; and FIG. 7 is a top plan view of the apparatus shown in FIG. 5 and illustrating the location of the three-way valve of FIG. 6 with respect to the other apparatus.

DESCRIPTION OF PREFERRED EMBODIMENT

Figure 1:
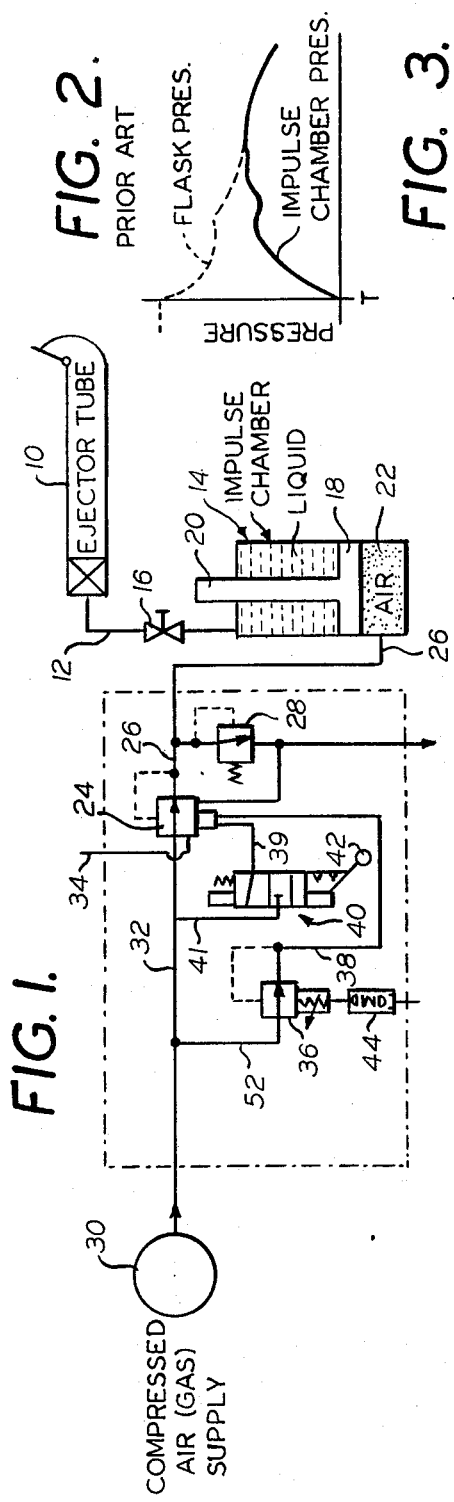
FIG. 1 is a diagrammatic view showing ejection apparatus made in accordance with this invention.

The ejector apparatus which is shown diagrammatically in FIG. 1 includes an article holder or ejector tube 10 from which the article is ejected when the apparatus is operated. The ejection is effected by a slug of water in the tube 10 and the tube 10 is connected by piping 12 to the downstream side of an impulse chamber 14 which also contains water. A valve 16 commands the piping 12 and when this valve is in open position the water in the impulse chamber 14 can be forced into the ejector tube 10 to provide part of the water slug that ejects an article from the tube 10.

In the construction illustrated, there is a piston 18 in the inpulse chamber 14 and the impulse chamber is a cylinder in which the piston 18 travels with appropriate guidance such as provided by the wall of the cylinder and by guides for a piston rod 20. The force for operating the ejector is developed by admitting compressed air into a space 22 on the side of the piston 18 opposite to the side that contacts with the water in the chamber 14. This air forces the piston 18 in a direction to expel the water from the impulse chamber into the ejector tube to provide a moving slug for ejecting the article held in the tube 10. The construction thus far described is conventional and no further description of it is necessary for a complete understanding of this invention.

Air pressure is supplied to the space 22 from a main regulator 24, the delivery side of which is connected to the upstream side of the impulse chamber 14 by piping 26. This piping is of large cross section so that the pressure drop between the delivery side of the regulator 24 and the air space 22 is minimized. It is also desirable to have the pressure regulator 24 as close as practical to the impulse chamber 14 so that the length of the piping 26 can be relatively short to further reduce pressure drop when gas is flowing from the regulator 24 to the impulse chamber 14.

A pressure relief valve 28 may also connect with the piping 26 to prevent possible over-pressurizing of the piping 26 and the impulse chamber 14.

The pressure regulator 24 receives its gas from a compressed air supply such as a reservoir 30. This reservoir 30 is connected with the high pressure side of the regulator 24 by piping 32. The pressure regulator 24 has a vent 34 through which gas can escape from the reduced pressure side of the regulator 24 and from the air space 22 of the impulse chamber through the piping 26. This provision for venting the impulse chamber will be explained more fully in connection with FIG. 5.

In the preferred construction of the invention, the pressure regulator 24 is loaded by a pilot regulator 36 which has its gas delivery outlet connected with the pressure loading chamber of the regulator 24 through piping 38. The pilot regulator 36 can be adjusted to supply gas at different pressure to change the loading of the main regulator 24 and to obtain resulting change in the delivery output of the main regulator.

A three-way valve 40, when in one position, provides communication, through piping 41, between the supply line 32 and an actuator in the main regulator 24. When the three-way valve 40 is moved into another position, it opens an exhaust valve through which pressure escapes from the actuator of the main regulator 24. By thus controlling the actuator of the main regulator 24, the regulator 24 operates to open the vent 34.

The three-way valve 40 is provided with a motor for remote control and is preferably solenoid operated; and it is also provided with a manual override 42 by which the valve 40 can be operated when there is no power available for the motor or when it is desirable to operate the valve 40 manually. The detailed construction of the valve 40 will be explained in connection with FIG. 6.

The ejector apparatus of this invention is preferably provided with a compensator 44 which automatically changes the pressure supplied to the impulse chamber to control the differential of such pressure and that of the ambient medium, such as the water in which a submarine is immersed. The compensator and its operation will be described in connection with FIG. 4.

Figure 2:
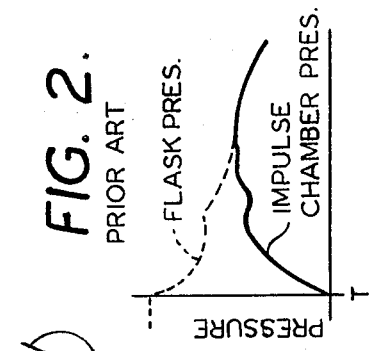
FIG. 2 is a graph illustrating the operation of ejection apparatus of the prior art.
Figure 3:
FIG. 3 is a graph similar to FIG. 2 but showing the operation of the present invention.

FIGS. 2 and 3 illustrate the difference in principle between this invention and ejection apparatus of the prior art. The graph of FIG. 2 has pressure plotted along the ordinate and time plotted along the absicca.

FIG. 2 represents the pressure variation in an ejector system that uses a flask of compressed air. The flask is put into communication with the impulse chamber at time T by opening of a valve between the flask and the impulse chamber. The pressure of air in the flask drops as a function of the ratio $V_1/V_2$ as indicated by the broken line in FIG. 2, while the pressure in the impulse chamber increases as indicated by the solid line. The gas contained in the flask expands as it forces water out of the impulse chamber into the ejection tube.

FIG. 2 shows the pressure changes with surges that result from the initial rush of gas from the flask into the impulse chamber, but the surge damp out and the overall effective expansion of the gas is substantially adiabatic. The final pressure in FIG. 2 can be computed from the initial pressure and the volume of the flask and the added volume of the impulse chamber and piping connections into which the gas from the flask expands. Uniform results are not obtained with repeated operations. A disadvantage of the prior art is that the large flask must be recharged to its original pressure to approximate a similar ejection in a repeat operation.

FIG. 3 shows the way in which the pressure in the impulse chamber is built up rapidly and maintained by gas pressure supplied from the pressure regulator. By having the capacity of the pressure regulator correlated with the demand of the ejector apparatus, the pressure in the impulse chamber can be built up rapidly to a pressure equal to that of the regulator delivery output and can be maintained at that value during the entire time that the ejector apparatus is accelerating the article which it ejects. Operating on the principle illustrated in FIG. 3, the ejector apparatus of this invention obtains uniform repeat results and it also makes it unnecessary to delay a repeat operation while a flask is recharged to a predetermined starting pressure. The regulator makes available the full delivery pressure whenever the ejection apparatus has been vented from one operation and is ready for a repeat operation.

Figure 4:
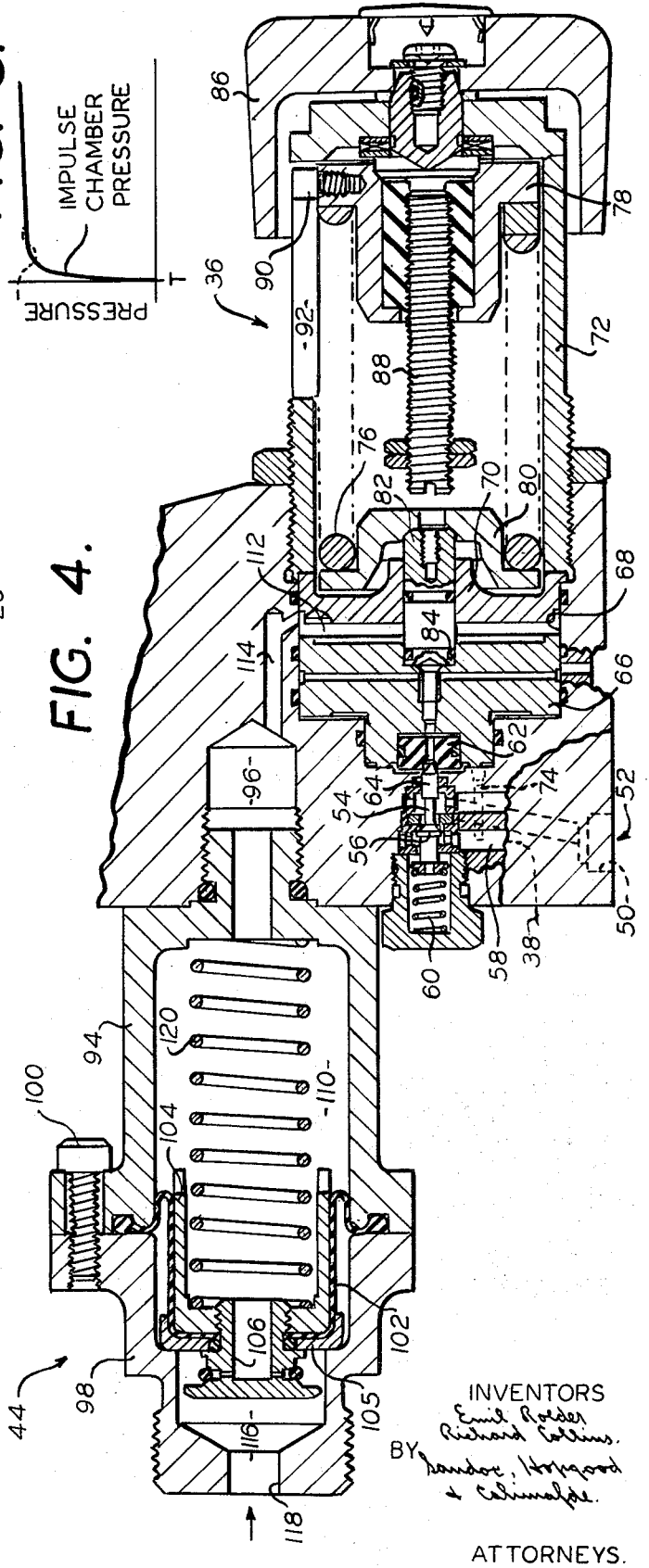
FIG. 4 is a sectional view showing the pilot regulator of FIG. 1 equipped with a compensator for changing the delivery pressure of the pilot regulator in accordance with changes in the ambient medium around the apparatus.

FIG. 4 shows the pilot regulator 36. This regulator has an inlet conduit 50 which is connected with the gas supply line 32 of FIG. 1 by piping 52. The port 50 opens into a valve chamber 54 of the pilot regulator. A valve element 56 in the valve chamber controls flow of gas to a delivery outlet passage 58 which connects with the piping 38 that leads to the loading chamber of the main regulator 24 (FIG. 1).

The valve 56 is urged toward closed position by a spring 60. The valve 56 is urged toward open position by force of a seat 62 which contacts with an end of the stem of the valve 56 and this stem is shaped to operate as a needle valve 64.

The seat 62 is held in a recess in a piston 66 which slides in a cylindrical portion 68 of the housing of the pilot valve 36. An end wall 70 is located in position to close the end of the cylindrical portion 68 and is clamped in fixed position in the housing by a sleeve 72 which threads into the housing.

One end of the cylindrical portion 68, which is shown as of reduced diameter, communicates with the delivery outlet passage 58 through a communicating passage 74. The delivery pressure in the passage 58 is communicated through the passage 74 to the left hand end of the piston 66 in FIG. 4 and urges the piston 66 to move to the right so that the seat 62 which moves as a unit with the piston 66 will permit the stem of the valve 56 to move to the right and the spring 60 to close the valve 56.

The piston 66 is urged to move toward the left by a spring 76 located in the sleeve 72 and compressed between an end fitting 78 and a plate 80 that bears against a rod 82 extending into a recess 84 in the right hand space of the piston 66.

The force of the spring 76 can be adjusted to change the pressure which urges the valve 56 toward open position by rotating a knob 86 which turns a connected screw 88 on which the end fitting 78 is threaded. A set screw 90 extending into a slot 92 in the sleeve 72 prevents the end fitting 78 from rotating when the screw 88 turns, and thus the end fitting moves axially along the screw 88 when the knob 86 is rotated. This changes the compression of the spring 76 with resulting change in pressure through the rod 82 to the needle valve 64 of the valve stem which transmits pressure of the spring 76 to the valve 56 to urge the valve 56 into open position.

The compensator 44 has a housing consisting of a right hand section 94 which screws into a cavity 96 of the housing of the pilot regulator 36. The compensator also has a left hand section 98 connected to the right hand section 94 by a circle of screws 100. A diaphragm 102 has its peripheral edge portion clamped between the confronting flanges of the housing sections 94 and 98.

The diaphragm 102 is clamped at its middle region between an inner fitting 104 and an outer fitting 105. This clamping of the fittings 104 and 105 against opposite sides of the diaphragm 102 is effected by a threaded pressure element 106 which has a shoulder bearing against the outer fitting 105. This pressure element 106 threads into the inner fitting 104.

The diaphragm 102 is a movable wall dividing the interior of the housing of the compensator into two chambers including a spring chamber 110 which communicates directly with the chamber 96 of the pilot regulator; and the chamber 96 communicates with a space 112 between the piston 66 and the end wall 70 of the pilot regulator through a passage 114.

In the compensator housing on the left hand side of the diaphragm 102, there is a chamber 116 which is open through a passage 18 to the ambient medium that surrounds the compensator and the ejector apparatus. If this ambient medium is water, and the apparatus descends to lower depths, then it will be apparent that the pressure against the outer fitting 105 and the diaphragm 102 will exert a force toward the right when this pressure becomes great enough to overcome a spring 120 located in the chamber 110 of the compensator.

This pressure is transmitted through fluid in the chamber 96 and passage 114 to the space 112. The increase in the chamber 112 urges the piston 66 to the left in FIG. 4 and increases the delivery pressure of the pilot regulator in the same way as if the knob 86 were operated to increase the force of the spring 76. This increase in the delivery pressure of the pilot regulator 36 increases the pressure in the loading chamber of the main regulator 24 and thus adjusts the main regulator 24 for a higher delivery pressure to the impulse chamber 14.

Figure 5:
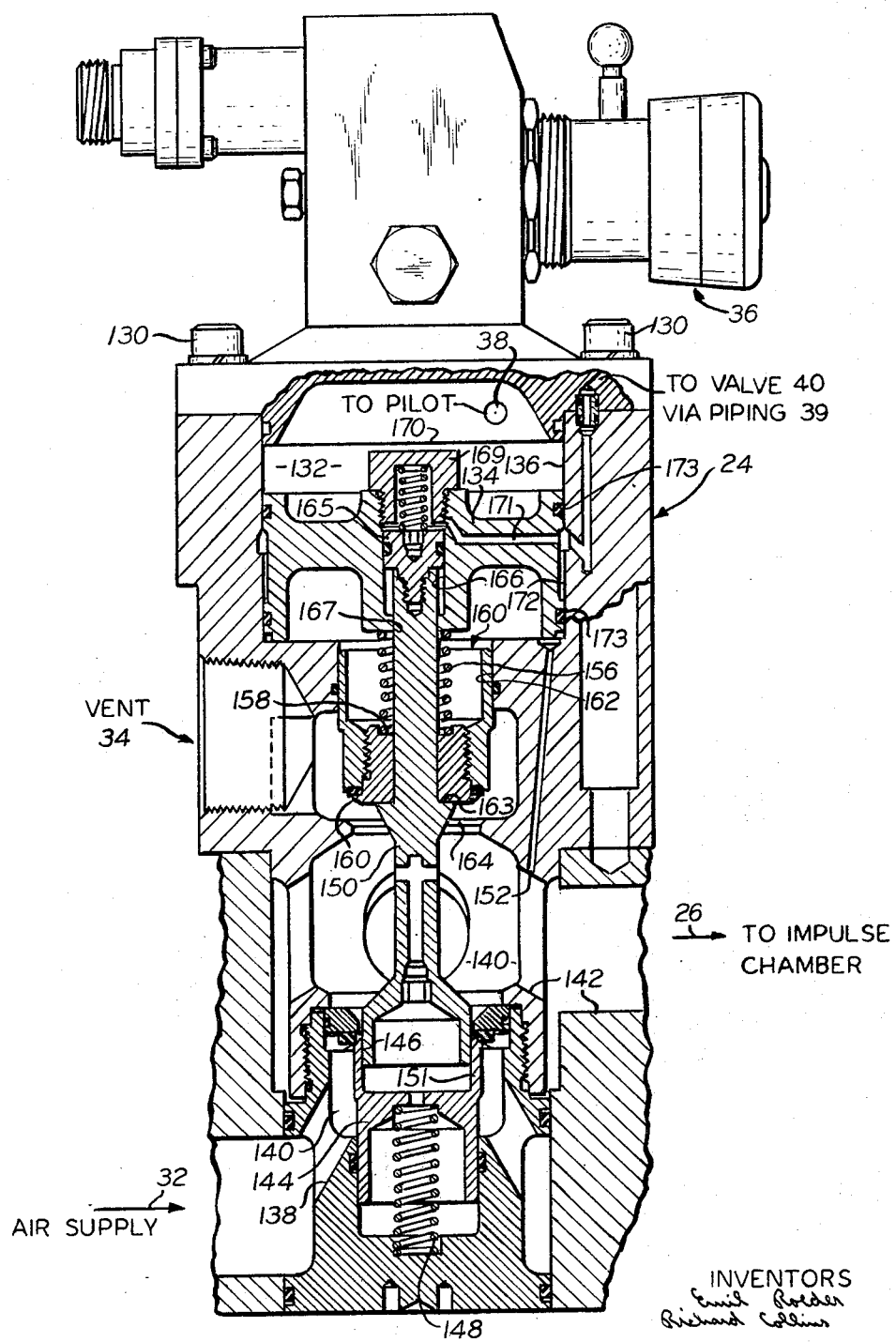
FIG. 5 is a view showing the apparatus of FIG. 4 in elevation and showing the main regulator of FIG. 1 to which gas is supplied from the pilot regulator.

FIG. 5 shows the main regulator 24 connected to the lower end of the housing of the pilot regulator 36 by a circle of screws 30. The main regulator has a loading chamber 132 which contains a movable wall consisting of a piston 134 which is movable in a cylindrical bore 136 that forms a guide for the piston 134. High pressure gas enters the main regulator from piping 32 and flows through passages 138 into a valve chamber 140. Gas escapes from the valve chamber 140 through a delivery passage 142 which communicates through piping 26 with the impulse chamber of the ejection apparatus.

A valve 144 in the valve chamber 140 is urged against a seat element 146 by a compression spring 148 located in a recess in the underside of the valve element 144.

The valve element 144 is moved downward against the force of the spring 148, by a valve stem 150 which fits into a bore 151 in the upper part of the valve element 144. This valve stem 150 slides in the bore in the valve element 144 so as to provide lost motion between the valve 144 and the piston 134 which forms the movable wall of the loading chamber 132.

Whenever the valve stem 150 moves downward far enough to contact with the bottom of the bore 151 in the valve element 144, further downward movement of the valve stem 150 moves the valve element 144 away from its seat 146 and opens the valve element 144 so that gas can flow from the passages 138, through the valve chamber 140 and out through the delivery passage 142.

There is a communication passage 152 leading from the delivery passage 142 to the cylindrical bore 136 in which the piston 134 slides. Thus the piston 134 is subject at all times to the pressure in the delivery passage 142 acting against the underside of the piston 134 and the pressure in the loading chamber 132 acting against the upper side of the piston 134.

The movable wall piston 134 of the loading chamber of the main regulator is urged upward by a spring 156 which is compressed against the lower end of a cylindrical bore 158 concentric with the cylindrical bore 136 but of smaller diameter. The bore 158 is in a valve element 160 which slides in a cylindrical guide bearing 162. The spring 156 holds the valve element 160 against a shoulder 163 of the valve stem 150. When the valve stem 150 moves downward far enough, the valve element 160 seats against a valve seat 164.

Within the piston 134, there is a piston 165 which slides up and down in a cylinder 166 formed in the piston 134. This piston 165 is secured to the upper end of the valve stem 150 which slides in a guide bearing 167 on the piston 134.

The valve stem 160 is a vent valve for the regulator 24. Whenever the valve element 160 moves away from its seat 164, it puts the valve chamber 140 and the passage 142, that leads to the impulse chamber, in communication with a port 168 that connects with the vent outlet 34. In the construction illustrated in FIG. 5, the vent valve element 160 may be described as "normally open" because there is a lost motion between this vent valve element 160 and the piston 134; this lost motion being provided by the stroke of the piston 165 in the cylinder 166.

The upper end of the cylinder 166 is closed by a cylinder head comprising a plug 169 threaded into the upper end of the cylinder. A socket at the lower end of the plug 169 holds a spring 170 that exerts pressure downward on the piston 165 and the valve stem 150 to which the piston 165 is connected. There is a passage 171 leading through one side of the piston 134 into the cylinder 166 just below the plug 169. The passage 171 communicates with a radial clearance 172 between the piston 134 and the wall of the cylinder 136. This clearance 172 is sealed off from the parts of the cylinder by sealing rings 173 carried by the piston.

The portion of the cylinder 166 above the piston 165 communicates through the passage 171, clearance 172, and a passage 174 in the wall of the cylinder 136, with piping 39 leading to the three-way valve 40. When fluid under pressure is supplied to the cylinder 166 from the valve 40, the piston 165 is pushed down and it moves the valve stem 150 downward until the valve 160 closes against the seat 164 This closes the vent 34.

When the lower end of the valve stem 150 touches the bottom of the bore 151, further downward movement of the stem 150 moves the valve element 144 away from its seat 146 to establish communication between the supply piping 32 and the piping 26 leading from the delivery side of the regulator to the impulse chamber. This further downward movement of the valve stem 150 is possible, after the valve element 160 is closed against its seat 164, because the shoulder 163 is not connected to the valve element 160 and can continue to move downward even though the seat 164 stops further movement of the valve element 160. As the shoulder 163 moves downward away from the valve element 160, the spring 156 urges the valve element 160 toward the valve seat 164 and holds the valve element 160 in contact with the seat if pressure in the valve chamber 140 is within normal limits.

When the valve element 144 moves into open position, fluid flows through the valve chamber 140 with rapid build-up of pressure in the valve chamber downstream of the valve element 144 and in the line 26 until the pressure reaches that for which the chamber 132 is located. This delivery pressure of the regulator is transmitted through the passage 152 to the cylinder 136 below the piston 134, and aided by the force of the springs 148 and 156, the pressure in the piston 134 moves the piston upward against the pressure of the fluid in the loading chamber 132 above the piston. This upward movement of the piston 134 eventually lifts the stem 150 far enough to move the valve element 144 closer to its seat 146 or into contact with the seat 146, as required, to stop further rise in delivery pressure of the regulator 24. This occurs even though the piston 165 is against the lower end of its cylinder 166 and all of the lost motion provided by this piston 165 is taken up in a downward direction.

Regardless of the position of the piston 134, the vent valve element 160 can be moved into open position to act as a relief valve whenever the pressure under the valve element 160 becomes high enough to overcome the force of the spring 156.

At any time that it is desired to vent the impulse chamber through the vent 34, pressure in the cylinder 166 above the piston 165 can be exhausted through the valve 40. The spring 148 will immediately move the valve element 144 into closed position so that there is no further delivery from the regulator regardless of the ratio of downstream pressure to pressure in the loading chamber 132. With the collapse of pressure above the piston 165, upward pressure of the stem 150 causes the valve stem to move upward and the shoulder 163 moves the vent valve element 160 into open position. The lower end of the valve stem 150 slides in a guideway 151 to permit further upward movement of the stem 150 and valve element 160 after the valve element 144 is against this seat and can move upward no further.

Thus the valve 40 provides remote control means for taking up the lost motion connection between the movable wall (piston 134) and the valve element 144. The valve element 144 can thereby be operated to start or stop delivery by the main regulator and to vent the impulse chamber through the main regulator without changing the pressure in the loading chamber 132 of the main regulator. Substantial saving in operating time and cycle length results from the use of the small volume cylinder 166 instead of having to charge and discharge the large volume of the loading chamber 132.

FIG. 6 shows the three-way valve 40. This valve includes a housing 175 in which there is a valve chamber 176 having three ports opening through the side of the valve housing 175. These ports include a port 178 which provides communication between the valve chamber 176 and the supply of compressed air 32 through the piping 41. A second port 180 provides communication between the valve chamber 176 and the actuator cylinder 166 of the main regulator 24 through piping 39; and a third port 182 opens into the ambient atmosphere and provides for exhaust of gas from the valve chamber 176.

There is a valve element 184 located in the valve chamber 176 and provided with valve stems at both ends which slide in guides in the housing with appropriate O-rings for sealing. There is a valve seat 186 in the valve chamber 176 in position for the valve element 184 to close off communication between the port 178 and the rest of the valve chamber. There is another valve seat 188 in the valve chamber 176 between the ports 180 and 182 so that when the valve element 184 closes against this port 188, the port 182 is shut off from communication with the rest of the valve chamber.

The valve element 184 is urged toward the right in FIG. 6 by a coil spring 190. This spring is compressed between a shoulder on the stem of the valve element 184 and a recessed plug 192 that threads into a bushing 194 screwed into the end of the housing 175. The bushing 194 holds the valve seats 186 and 188 and the appropriate spacers in position against a shoulder in the valve chamber 176. The plug 192 can be adjusted axially by screwing it in the bushing 194 to adjust the pressure of the spring 190 and this pressure adjustment determines the force required to move the valve element 184 away from the seat 186 and into contact with the seat 188.

The valve element 184 is moved to the left in FIG. 6 by a motor comprising a solenoid which has a frame 196, part of which forms the core of the solenoid; and which has a winding 198 for energizing the solenoid. An armature 200 is located at the right hand end of the frame 196 and this armature 200 is spaced from the frame 196 when the valve element 184 is closed against the valve seat 186. The winding 198 has conductors 202 which lead to a terminal box 204 (FIG. 7) which has a socket 206 for receiving a fitting from a power line. The power line is energized whenever the valve element 184 is to be moved away from the valve seat 186 and into contact with the valve seat 188. Thus energizing of the winding 198 of the solenoid moves the valve element 184 to cut off communication between the port 180, which connects through piping 39 with the actuator cylinder of the main regulator, and the exhaust port 182. This movement of the valve element 184 opens communication between the port 178 to the port 180 so that air or gas under pressure from the pilot valve flows to the port 180 and from this port to the actuator cylinder of the main regulator to again open the pressure regulating valve of the main regulator.

Movement of the armature 200 is transmitted to the valve element 184 through a stem 210 which is attached to the armature by a sleeve nut 212 threaded on the stem 210 and a clamping nut 214 on the other side of a bracket 216 secured to the armature 200.

The manual override 42 consists of a lever 220 which has pivotal movement about an axle 222 carried by brackets 224 which extend from the end of the housing of the solenoid.

Movement of the lever 220 into the full line position shown in FIG. 6 brings a face 226 into contact with the end of the plunger or stem 210 and pushes the stem 210 to the left so as to have the same effect as the movement of the armature 200 by energizing of the winding 198. When the handle 220 is moved into the broken line position shown in FIG. 6, a different face 228 is brought into contact with the end of the stem 210. This face 228 is closer to the axis of the axle 220 and thus permits the stem 210 to move toward the right under the influence of the spring 190 so that the valve element 184 moves to the right and closes against the valve seat 186 at the same time opening the valve element 184 with respect to the valve seat 188.

When the override 42 has its lever 220 in the position shown in broken lines in FIG. 6, it does not affect the operation of the valve by the solenoid. There is a stop 230 connected with one or both of the brackets 224 in position to hold the lever 220 in the broken line position of FIG. 6. In order to prevent accidental operation of the manual override, there is a pin 232 similar to a cotter pin but provided with an unusually large loop 234 by which the pin can be conveniently removed or inserted in an opening through the brackets 224 and the lever 220 to lock the lever against movement. This construction is best shown in FIG. 7.

The preferred embodiment of the invention has been illustrated and described but changes and modifications can be made and some features can be used in different combinations without departing from the invention as defined in the claims.

What is claimed is:

1. An ejection apparatus comprising means for holding an article and for ejecting it by fluid pressure, said means including an impulse chamber to which gas is supplied to develop the fluid pressure and in which gas volume increases during ejection of the article, a source of compressed gas, a pressure regulator that receives compressed gas from said source and that delivers gas, at a controlled reduced pressure to the impulse chamber for producing a rate of discharge of fluid from the chamber, the gas delivery pressure of the regulator being correlated with the intended acceleration of the article during ejection to maintain the pressure in the impulse chamber substantially equal to the output delivery pressure of the regulator, a pressure compensator exposed to the same ambient medium as that into which the article is ejected by said apparatus, the pressure compensator being connected with the pressure regulator and including automatic means responsive to changes in the ambient medium, an adjustment mechanism that changes the gas delivery pressure of the regulator, said automatic means being connected with said adjustment mechanism and operated to change the adjustment in a direction to maintain the differential of the pressure supplied to the impulse chamber and that of the ambient medium.

2. The ejection apparatus described in claim 1 characterized by the pressure regulator including a valve element that controls the flow of gas through the regulator from the high pressure inlet side of the regulator to the lower pressure delivery side of the regulator, loading means responsive to the delivery pressure for closing the valve element when the delivery pressure exceeds a predetermined maximum, said loading means including a loading element that operates in conjunction with the compensator and which is adjustable independently of the compensator, said loading means also including means through which the compensator imposes added force on the loading means from the pressure of the ambient medium, said added force being proportional to the increase in the pressure of the ambient medium.

3. The ejection apparatus described in claim 2 characterized by the loading means including a movable wall and a spring loading the wall against movement in a direction in which the wall moves in response to increase in the delivery pressure of the regulator, and said loading means including a chamber behind the movable wall and communicating with a liquid chamber in the compensator, the compensator having a movable wall exposed on one side to the liquid in said liquid chamber and exposed on the other side to the ambient medium, and means for adjusting the force of the spring.

4. The ejection apparatus described in claim 1 characterized by the pressure regulator comprising two individual regulators including a main regulator that delivers gas to the impulse chamber and including also a pilot regulator that loads the main regulator to control the delivery pressure of the main regulator, the pilot regulator having adjustable means for changing the loading of the main regulator, and the compensator being connected with one of said individual regulators.

5. The ejection apparatus described in claim 1 characterized by the main regulator having a loading chamber with a movable wall, said loading chamber of the main regulator being connected with and receiving gas from a delivery outlet of the pilot regulator, the compensator being connected with the pilot regulator, and the pilot regulator having adjustment means responsive to the compensator to adjust the delivery pressure of the pilot regulator and the resulting loading of the main regulator.

6. The ejection apparatus described in claim 5 characterized by a gas delivery line connecting the delivery side of the pilot regulator with the loading chamber of the main regulator, a lost motion connection between the movable wall of the loading chamber, and remote control means for the lost motion connection operable to take up said lost motion, including a motor connected with the remote control means, and a manual override for operating the remote control means.

7. An ejection apparatus comprising means for holding an article and for ejecting it by fluid pressure, said means including an impulse chamber to which gas is supplied to develop the fluid pressure and in which gas volume increases during ejection of the article, a source of compressed gas, a pressure regulator that receives compressed gas from said source and that delivers gas, at a controlled reduced pressure to the impulse chamber for producing a rate of discharge of fluid from the chamber, the gas delivery pressure of the regulator being correlated with the intended acceleration of the article during ejection to maintain the pressure in the impulse chamber substantially equal to the output delivery pressure of the regulator, an adjustment mechanism that changes the gas delivery pressure of the regulator, said adjustment mechanism including a loading chamber and a movable wall of the loading chamber exposed to gas under pressure in the loading chamber and exerting force to open the pressure regulating valve element of the regulator to pass gas to the delivery outlet of the regulator, said movable wall being exposed to the delivery pressure of the regulator on the side of the movable wall opposite the loading chamber, a relief valve element in the regulator for venting the delivery side of the regulator, and motion-transmitting connections between the movable wall and the pressure regulating valve element for closing said valve independently of the position of the movable wall after each operation of the ejection apparatus preparatory to exhausting of the impulse chamber preparatory to another operation.

8. The ejection apparatus described in claim 7 characterized by first and second valve elements in the regulator, both of which are connected with the movable wall and so correlated with their seats that the first valve element moves into closed position when the movable wall expands the loading chamber and the second valve element moves into closed position when the movable wall contracts the loading chamber, and a spring-loaded lost motion connection between the first of the valve elements and the movable wall providing for continued movement of the movable wall and the second of the valve elements after the first of the valve elements has moved into closed position.

9. An ejection apparatus comprising means for holding an article and for ejecting it by fluid pressure, said means including an impulse chamber to which gas is supplied to develop the fluid pressure and in which the gas volume increases during ejection of the article, a source of compressed gas, a pressure regulator that receives compressed gas from said source and that delivers gas, at a controlled reduced pressure to the chamber for a predetermined rate of discharge of fluid from the chamber, a valve for venting the impulse chamber preparatory to another ejection operation, and common control means connected with the regulator and the venting valve for shutting off all delivery of gas from the regulator to the impulse chamber and for automatically opening the vent valve at the time that said delivery from the regulator to the impulse chamber is shut off.

10. The ejection apparatus described in claim 9 characterized by the pressure regulator including a valve element that controls the flow of gas through the regulator from the high pressure inlet side of the regulator to the lower pressure delivery side of the regulator, loading means responsive to the delivery pressure for closing the valve element when the delivery pressure exceeds a predetermined maximum, said loading means including a movable wall that is loaded on the side opposite the delivery pressure of the regulator by gas pressure in a loading chamber, a pilot regulator that receives gas at higher pressure and that delivers gas at lower pressure to the loading chamber of the first regulator, the valve for venting the impulse chamber being a vent valve in the first regulator, and the common control means being an actuator that closes said valve element and that opens the vent valve independently of the position of the movable wall of the loading chamber of the first regulator, whereby loading of said chamber can remain constant during successive operations.

11. The method of operating apparatus for ejecting an article from a tube assembly by means of pressure of compressed gas from a high pressure reservoir, which pressure is exerted against the article in the tube assembly to eject the article therefrom, which method comprises supplying gas from the high pressure reservoir to an impulse chamber having a supply of liquid therein, wherein said gas is first directed through a pressure regulator having a loading chamber that determines the delivery pressure to the upstream side of the impulse chamber from the regulator and limits said delivery pressure to a value less than the pressure in the high pressure reservoir, transferring said delivery pressure to said tube assembly by directing said delivery pressure into the upstream side of said chamber to force liquid in said chamber through an exit in the downstream side thereof, said liquid being in communication with said tube assembly by way of said downstream exit so that said liquid consequently transfers said delivery pressure to said tube assembly to exert force on said article to cause it to eject from said assembly, during acceleration of the article to ejection velocity, continuing to supply gas at said delivery pressure for a controlled period of time, and operating the pressure regulator to vent the gas from the impulse chamber after ejection of said article without changing the force in the loading chamber whereby to obtain uniform successive operations of the ejecting apparatus.

12. The method described in claim 11 characterized by the venting of the impulse chamber pulling back any elements of the ejecting mechanism that are moved during the ejecting operation, and performing a successive operation of the ejection apparatus without recharging of air flasks by again supplying air to the ejecting apparatus at the delivery pressure from said regulator during the accelerating and ejecting of the article in said successive operation.

* * * * *